United States Patent [19]
Springer et al.

[11] 3,850,144
[45] Nov. 26, 1974

[54] PET CARRIER

[76] Inventors: Mary Lou Springer, Rt. 1, Hale Center, Tex. 79041; Lisle K. Borom, No. 3 Pine Pl., Roswell, N. Mex. 88201

[22] Filed: Aug. 17, 1973

[21] Appl. No.: 389,354

[52] U.S. Cl. ................................. 119/19
[51] Int. Cl. ............................ A01k 29/00
[58] Field of Search .................. 119/19, 1, 96, 160

[56] References Cited
UNITED STATES PATENTS

| | | | |
|---|---|---|---|
| 2,170,379 | 8/1939 | Ortt | 119/19 |
| 2,538,778 | 1/1951 | Halpin | 119/19 |
| 3,150,640 | 9/1964 | Nevitt | 119/96 |
| 3,156,213 | 11/1964 | Patten | 119/19 |
| 3,596,636 | 8/1971 | Stobaugh | 119/160 |

Primary Examiner—Hugh R. Chamblee
Attorney, Agent, or Firm—Wayland D. Keith

[57] ABSTRACT

An animal carrying bag which has an adjustable shoulder strap, to relieve the hands of the weight of the animal, which carrying bag is of a size to accomodate the animal, and will allow the head and neck to extend through an opening in the end of the bag, the size of which opening is controlled by a adjustable fastening means, so the animal will be restrained within the bag without discomfort. A zippered opening in the top of the bag, longitudinally thereof enables the animal to be placed in the bag and removed therefrom in a minimum of time. The bag is preferably made of the minimum number of pieces, of durable, washable, woven fabric, or other suitable material. A stiff, removable, plastic covered board forms the bottom of the carrier. A removable, absorbent pad extends over the lower surface of the bag.

9 Claims, 6 Drawing Figures

PATENTED NOV 26 1974 3,850,144

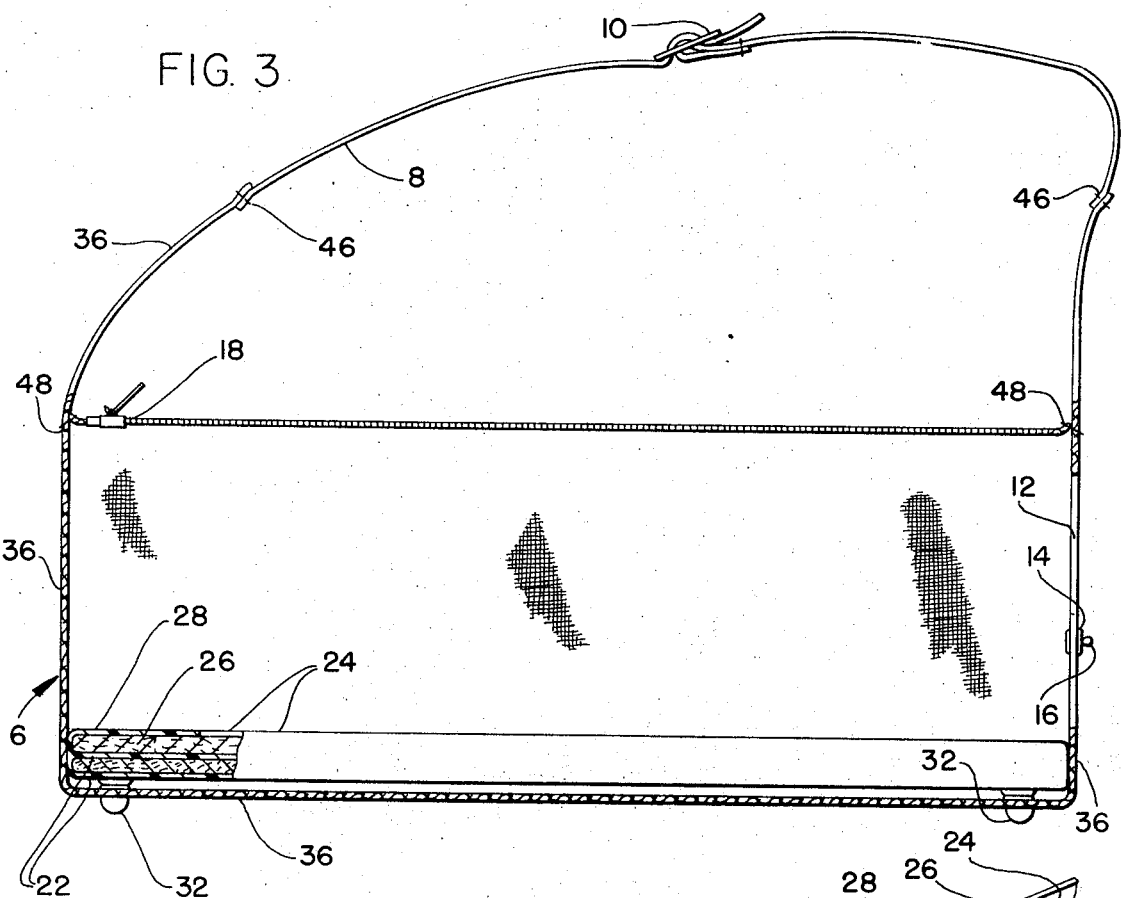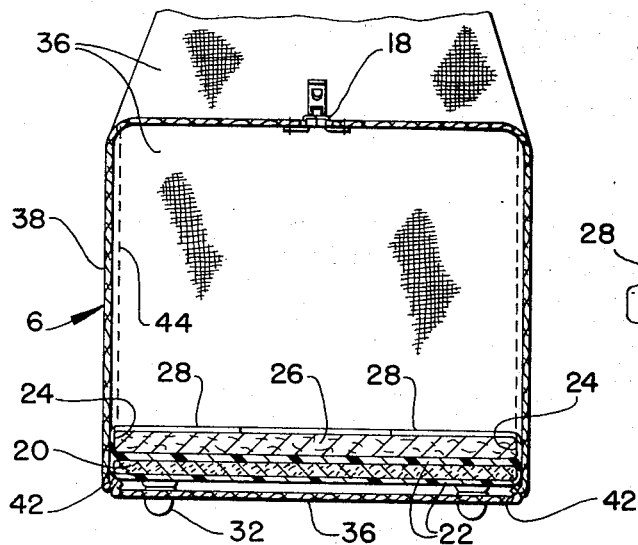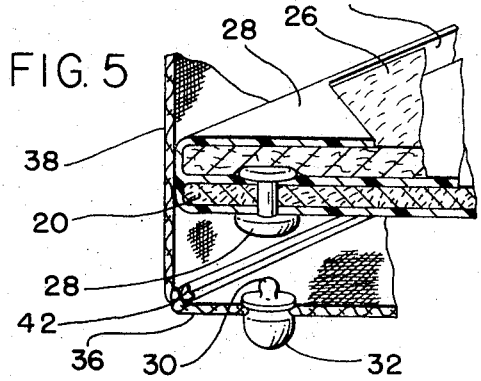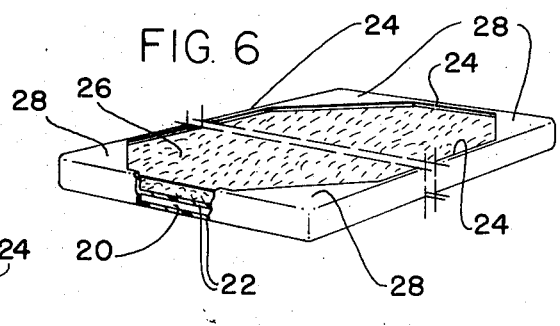

PET CARRIER

BACKGROUND OF THE INVENTION

Various animal and pet carrying devices have been proposed heretofore, but these for the most part, required a number of pieces of material for the construction thereof, and for the most part the sanitary aspect of such devices has been neglected. In the present device the portion on which the animal lies may be removed and discarded, and is of such stiffness and character as to provide the animal with a feeling of security and with secure footing while in the bag.

| Prior Art | | |
|---|---|---|
| No. 2 969 767 | Bassett | Jan. 31, 1961 |
| No. 3 150 640 | Nevitt | Sept. 29, 1964 |
| No. 3 547 079 | Bassett | Dec. 15, 1970 |

SUMMARY OF THE INVENTION

The present invention is so constructed that an animal, such as a dog or a cat or other pet may be put into the bag through a zippered opening, so the head will pass through another opening in the end of the bag and a strap, having quick fastening means such as a snap, is provided so the size of the opening may be adjusted to the size of the pet, to give freedom to the head and neck but will not allow the animal to escape through this opening.

The entrance and exit opening extends longitudinally of the bag and the zipper is provided to completely enclose the pet within the bag.

An adjustable shoulder strap is provided which attaches to the bag and may be adjusted so that the animal, such as a dog or a cat, can be supported by the shoulder strap at a convenient height and angle for the person handling the pet.

The bottom of the bag has four snaps, the lower portions of which snaps extend through the bottom of the bag and form legs. The upper portion of the snaps form interengaging members with the complementary portion of the snaps that are secured to a relatively stiff board, such as binders board, which is covered in sealed relation with a plastic cover. The board has diagonal corner portions formed over each corner thereof to receive the corners of the absorbent pad thereunder. It is preferable to have upstanding plastic walls extending between the corners, which walls are of approximately the same height as the absorbent pad. The pad may be of blotting paper stock or of synthetic fibers formed into a pad, the corners of the pad are inserted under the corners on the board, which pad and stiff board may be snapped into place to form a covering from the bottom of the bag.

It is preferable to make the bag of the fewest number of pieces of material, which in the present instance is five, with the exception of the fasteners and the buckle. This is a matter of illustration and the inventors do not wish to be limited to an exact number of pieces of material, as economy in cutting and the number of machine processes may indicate a different number of pieces.

OBJECTS OF THE INVENTION

An object of this invention is to provide a pet carrier in the form of a bag, which may be supported from the shoulders of the carrier by a strap passing over the shoulders, with the animal being completely constrained within the bag.

Another object of the invention is to provide an animal or pet carrier which is so constructed that the animal has a secure footing to make the animal more comfortable and more secure.

Another object of the invention is to provide a removable bottom portion for the bottom of the bag, which portion may be removed for cleaning.

Still another object of the invention is to provide a sanitary bottom portion for the bag, which is a stiff board sealed within plastic or other material impervious to moisture, which bottom board has an absorbent, disposable pad overlying same.

Yet another object of the invention is to provide a hollow, open top plastic retainer for the absorbent pad in the bottom of the bag.

Yet a further object of the invention is to provide a pet carrier bag which has legs attached to the bottom thereof and to a stiff board in the bottom thereof so as to properly support the bag in which the animal is confined.

Still another object of the invention is to provide a disposable, absorbent pad for the bottom of the bag, which pad may be removed and replaced in a minimum of time.

BRIEF DESCRIPTION OF THE DRAWING

With these objects in mind and other which will become manifest as the description proceeds, reference is to be had to the accompanying drawings, in which like reference characters designate like parts in the several views thereof, in which:

FIG. 3 is an enlarged sectional view taken on the line 3—3 of FIG. 2, looking in the direction indicated by the arrows;

FIG. 4 is a sectional view taken on the line 4—4 of FIG. 2, looking in the direction indicated by the arrows, showing a section through the removable bottom board and the absorbent pad therefor, with a portion of the shoulder strap being broken away;

FIG. 5 is a greatly enlarged, sectional view of a corner portion of the bag, showing the legs thereon, and showing the fiber board and the absorbent pad in exploded position with respect to the bag, and showing a detail of the pad and the plastic covering for the fiber board and the plastic wall which surrounds the absorbent pad;

FIG. 6 is a perspective view, on a reduced scale, of the pad shown apart from the bag, with parts broken away and parts shortened to bring out the details of construction of the absorbent pad and the holder therefor.

DETAILED DESCRIPTION OF THE INVENTION

Figure 1:
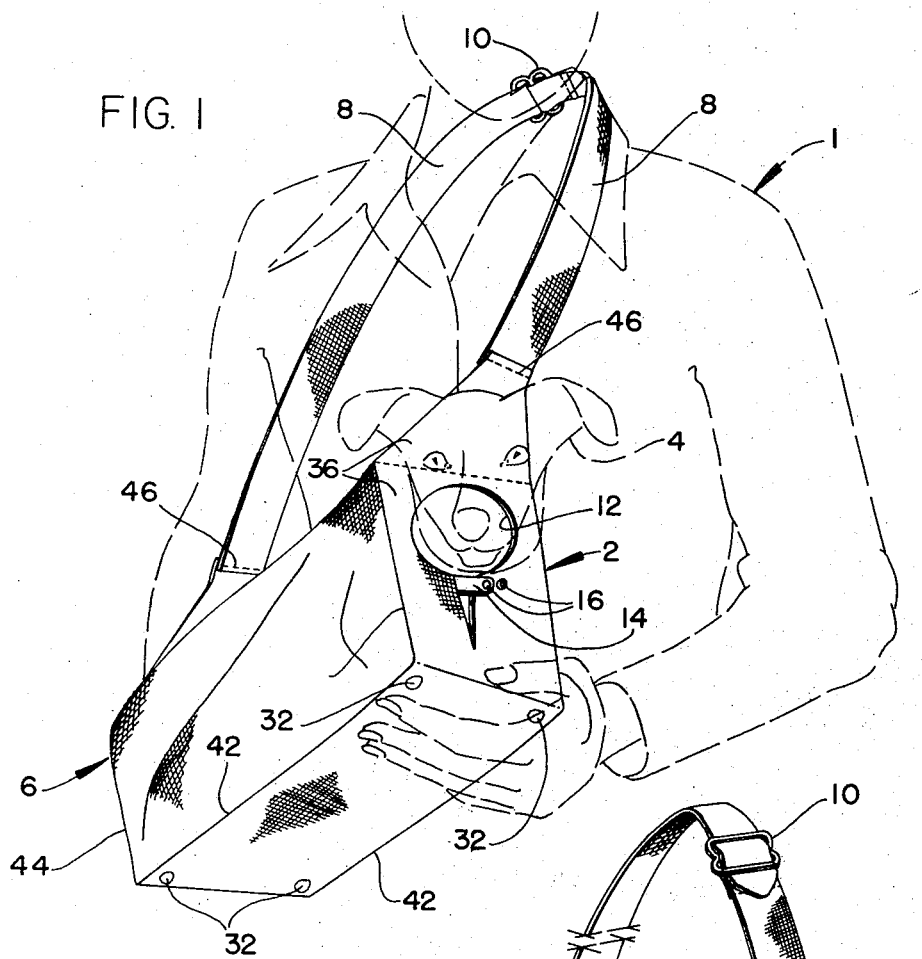
FIG. 1 is a perspective view of a portion of the human body, shown in dashed outline, and showing an end, bottom and side of the animal carrying bag, with the supporting shoulder strap therefor being shown in full outline, the animal's head, in dashed outline, being shown as extending through an opening in the end of the bag, and showing an adjustable strap and fastening means thereon.

With more detailed reference to the drawing, the numeral 1 designates generally the body of the person wearing the pet or animal carrier 2, so the animal 4 will be enclosed within the bag 6 of the carrier. The bag 6 has straps 8 secured thereto and extending upward therefrom at each end, with a adjustment buckle 10 interconnecting the ends of the strap portions 8, so as to adjust the length of the strap portions 8, thereby adjusting the position of the bag 6 with respect to the person of the individual wearing the carrier bag 2.

The bag 6 may be made in various sizes to accomodate pets or animals of various sizes. One end of the bag 6 has an opening 12 formed therein, which opening has a strap 14 across a portion thereof. When the animal is placed in the bag, the head passes through the opening 12. The size of the opening 12 is adjusted by the strap 14, which strap also restrains the animal within the bag. The opening may be quickly adjusted around the neck of the animal by means of fasteners 16, one portion of the fasteners being on the bag and the complementary portion thereof being on the strap 14. The bag 6 has a zipper 18 closing the longitudinal opening 19 in the top thereof, which opening admits the animal into the bag, and when the zipper is closed, will retain the animal therein. The head of the animal extends through the opening 12 in the end of the bag, when the strap 14 is in open position. After the animal is in the bag and the head extends through the opening 12, the strap 14 is adjusted to the proper size and snapped in place by fasteners 16.

The bottom of the bag is rectangular in shape and receives a fiber board or binder board member 20 in the bottom thereof, which board is covered by a plastic covering 22, so as to seal the fiber board or binder board against the entrance of moisture thereinto. An upstanding plastic wall 24 is secured to the plastic covering 22 and extends upward to receive an absorbent pad 26, which is fitted in place within the wall 24 and is held in place by plastic corner members 28 which extend across the corners of the pad so as to normally prevent dislocation of the pad, but which pad is sufficiently flexible that it may be readily removed by distorting the pad until it is released from the corners 28. In this manner the absorbent pad, which may be made of blotter stock, synthetic compressed fibers or the like, may be removed and discarded, when it becomes soiled.

The fiber board 20 has a portion of a friction snap 28 passing therethrough, preferably one near each corner thereof, with a complementary portion of each snap having a foot 32 thereon to complementally engage with snap portion 28, when in one position, and when released, enables the fiber board and the absorbent pad to be removed as a unit. With the absorbent pad 26 removed from the corners 28, the remaining portion of the assembly may be washed and sterilized, a clean absorbent pad installed under the corners 28 and with the wall 24, the unit assembly is passed through the opening 19 in the upper portion of the bag and snapped into place, so as to form a rigid footing or a bed for the pet or animal, since the board is firm and the pad relatively soft.

The bag per se is preferably made of water resistant fabric, some portions of which bag may be made of double thickness of material or all portions may be made of double thickness to insure the animal being properly constrained and to prolong the wearing qualities of the bag. However, for the purpose of illustration, the material is shown to be of a single thickness except for the facing around the neck opening.

Figure 2:
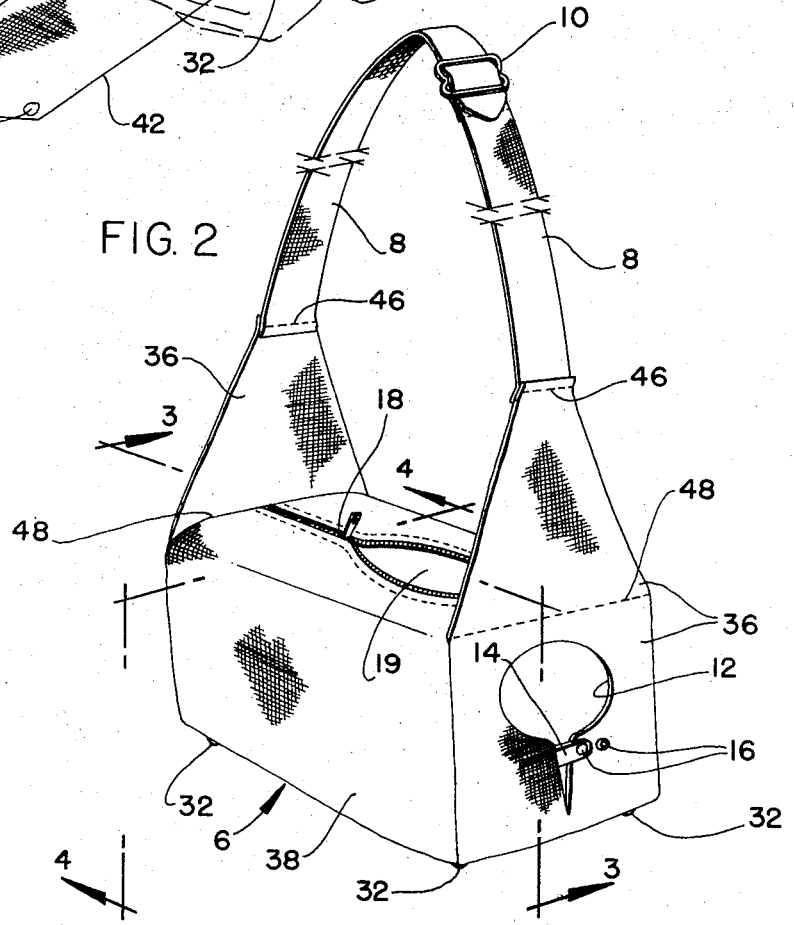
FIG. 2 is a perspective view of the animal carrying bag taken from an end, the top and a side thereof, showing a zipper in the top of the bag in partially open position, the shoulder straps being cut away and shortened.

The present animal or pet carrier 2 is made primarily of five major pieces of material, but could be made with fewer or with more. The portion of the material 36 which forms the bottom and ends and a portion of the material which joins with the strap portions 8. The side members 38 and 40 are stitched to the end and bottom portions 36 by stitching indicated at 42 and 44, with the upper portion 36 being stitched by stitching 46 to strap portions 8, as will best be seen in FIGS. 1 and 2. The stitching 48 closes the upper portion of sides 38 and 40 with the upwardly extending end and bottom portion 36.

What is claimed is:

1. A carrier for an animal, which carrier comprises;

a. an elongated, rectangular bag,
 1. said bag having a longitudinal top opening substantially throughout the length thereof,
 2. a zipper fastening element closing said opening when in one position and opening said opening when in another position,
b. said bag having a generally round opening formed in an end thereof,
 1. a slitted opening extending radially outward from said generally round opening so as to make the combined openings of a size to admit the head of an animal therethrough,
 2. a strap member secured to the end of said bag on one side of said slitted opening and extending thereacross,
 3. fastening means on the opposite end of said strap,
 4. complementary fastening means on the end of said bag adjacent said slitted opening to interengage with said fastening means on said strap, when said strap is in one position, so the round portion of the opening will surround the neck of the animal in relatively close fitting relation,
c. strap portions extending upwardly from each end of said bag, which portions are of a length to pass over the shoulder of the person carrying the bag.

2. A carrier for an animal as defined in claim 1; wherein a. said complementary fastening means being interengaging snap portions on said bag and said strap to adjust the size of the opening in the end of said bag,
 1. portions of said snaps being arranged so as to give at least two adjustments to the size of the opening in the end of said bag.

3. A carrier for an animal, as defined in claim 1; wherein a. said bag comprises fabric integrally forming bottom and end portions with an upstanding portion formed integrally with each end portion, b. strap portions secured to each upwardly extending portion of said end portions to form a shoulder strap,
  1. adjustment means to interconnect the upper ends of said strap portions,
c. side members connected along the edge of said bottom member and to each said end member so as to form a closed, rectangular bag, with the upper inner ends thereof being in adjusted relation on which to mount said zipper.

4. An animal carrier as defined in claim 1; wherein a. an absorbent pad is detachably secured to the upper face of the bottom of said bag.

5. A carrier for an animal, which carrier comprises;

a. an elongated, rectangular bag,
  1. said bag having a longitudinal opening substantially throughout the length thereof,
  2. a zipper fastening element closing said longitudinal opening, when in one position and opening said opening when in another position,
b. said bag having an opening formed in an end thereof of a size to admit the head of the animal to be carried therein,
  1. a member adapted to close a portion of said opening to prevent the animal from passing therethrough,
c. strap portions extending upwardly from each end of said bag, which portions are of a length to pass over the shoulder of the person carrying the bag, when the ends of said strap portions are secured together,
d. the bottom portion of said bag having a snap portion located near each corner thereof,
e. a rectangular fiber board of approximately the size and shape of the bottom of said bag,
f. complementary snap portions arranged on said fiber board near each corner thereof, so as to complementally engage the snap portions on the bottom of said bag when in one position and to release said snap portions when in another position, to enable said board to be removed from the bag.

6. A carrier for an animal as defined in claim 5; wherein a. said fiber board is covered with a waterproof covering.

7. A carrier for an animal, as defined in claim 6; wherein a. said waterproof covering has portions of material extending diagonally across the corners thereof,
b. an absorbent pad adapted to be positioned on said waterproof covering of said fiber board and extending under said diagonal portions of material at the corners thereof, when in one position so as to maintain said absorbent pad in adjusted relation with respect thereto.

8. An animal carrier as defined in claim 7; wherein a. an upstanding wall is secured to said waterproof covering of said absorbent pad which wall extends around said pad approximately the height thereof to retain moisture in said absorbent pad.

9. An animal carrier as defined in claim 5, wherein a. the bottom portion of the snap located in the bottom of the bag has an outwardly extending portion which forms a leg to support the bag, when said fiber board is snapped into place within the bottom of the bag.

* * * * *